Jan. 27, 1931. C. I. POLLARD Re. 17,942

HEEL MAKING MACHINE

Original Filed Feb. 4, 1927 4 Sheets-Sheet 1

INVENTOR
Carl I. Pollard
By his Attorney,
Harlow M. Davis

Jan. 27, 1931. C. I. POLLARD Re. 17,942

HEEL MAKING MACHINE

Original Filed Feb. 4, 1927 4 Sheets-Sheet 2

INVENTOR
Carl I. Pollard
By his Attorney,
Harlow M. Davis

Jan. 27, 1931. C. I. POLLARD Re. 17,942

HEEL MAKING MACHINE

Original Filed Feb. 4, 1927 4 Sheets-Sheet 3

INVENTOR
Carl I. Pollard
By his Attorney,
Harlow M. Davis

Jan. 27, 1931. C. I. POLLARD Re. 17,942

HEEL MAKING MACHINE

Original Filed Feb. 4, 1927 4 Sheets-Sheet 4

INVENTOR
Carl I. Pollard
By his Attorney:
Harlow M. Davis.

Reissued Jan. 27, 1931

Re. 17,942

UNITED STATES PATENT OFFICE

CARL I. POLLARD, OF WHEELERSBURG, OHIO, ASSIGNOR TO UNITED SHOE MACHINERY COMPANY, OF PATERSON, NEW JERSEY, A CORPORATION OF NEW JERSEY

HEEL-MAKING MACHINE

Original No. 1,731,589, dated October 15, 1929, Serial No. 165,799, filed February 4, 1927. Application for reissue filed July 22, 1930. Serial No. 469,902.

My invention relates to concaving machines.

It is the object of my invention to provide a heel concaving machine having a novel form of table, removable plate for guarding a cutter and supporting the heel, a novel mechanism for holding the heel while it is being cut and a novel arrangement for regulating the depth and taper of cutting.

In particular it is my object to provide means for concaving a heel without necessitating the use of holders operated by cams, which will be adaptable to take any type of heel, even a very low heel.

Referring to the drawings.

Figure 1:
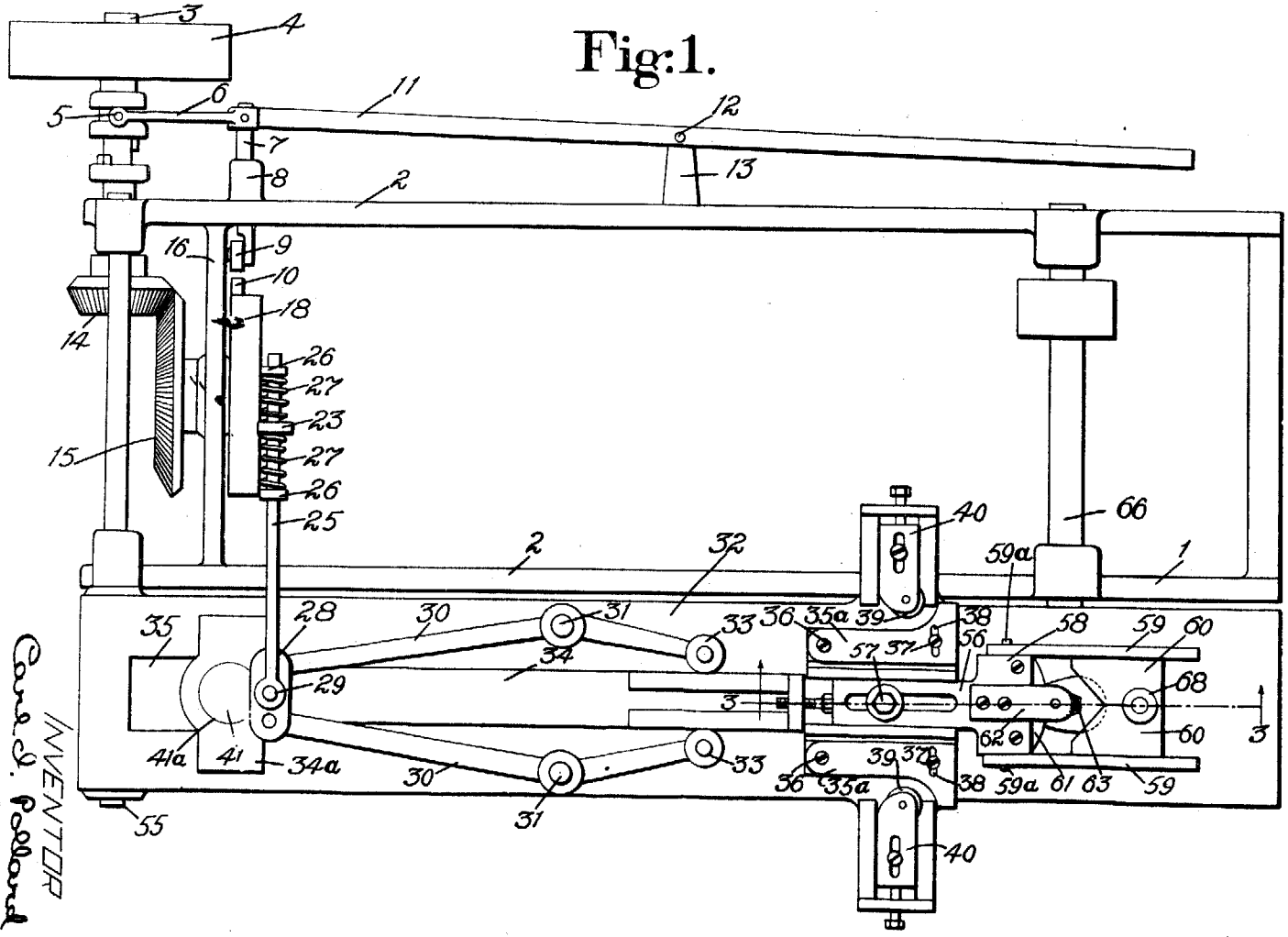
Fig. 1 is a plan view of my machine embodying my invention.
Figure 2:
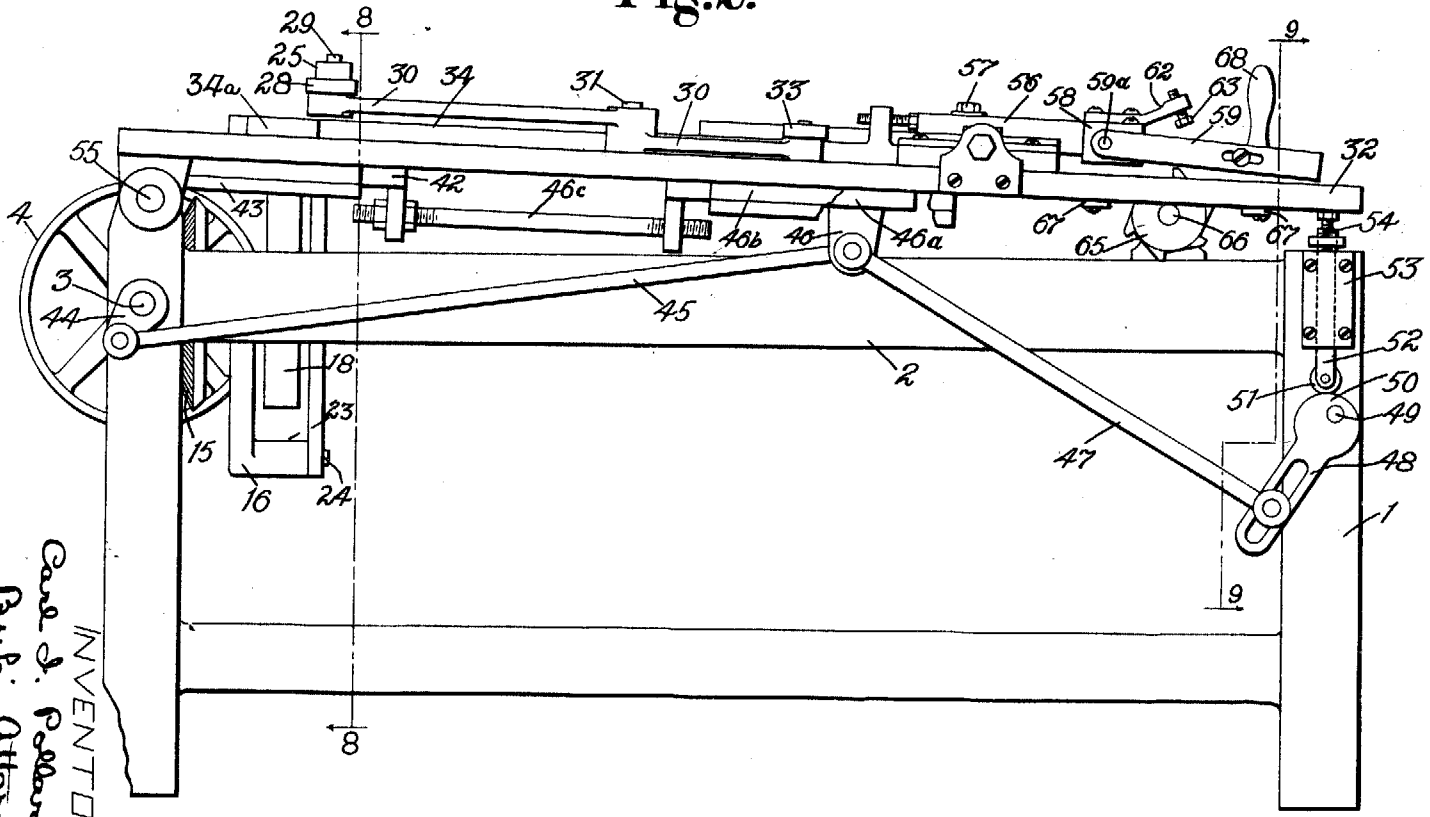
Fig. 2 is a side elevation thereof, showing the machine part way through its operative cycle.

Referring to the drawings in detail, 1 refers to the legs which support the horizontal members 2 of the frame. This frame carries a power shaft 3 which is driven by a pulley 4 from any suitable source of power. This power shaft is provided with a clutch 5 operated by the clutch lever 6 which starts and stops the power mechanism. This clutch lever 6 is connected to an operating shaft 7 sliding in a sleeve 8 in the frame member 2. The other end of the operating shaft is provided with a roller 9 adapted to be engaged by a projecting finger 10 (see Fig. 8) the purpose of which will be hereinafter described. This clutch arm 6 is connected to a hand lever 11 pivoted at 12 on a bracket 13 on the frame.

Figure 8:
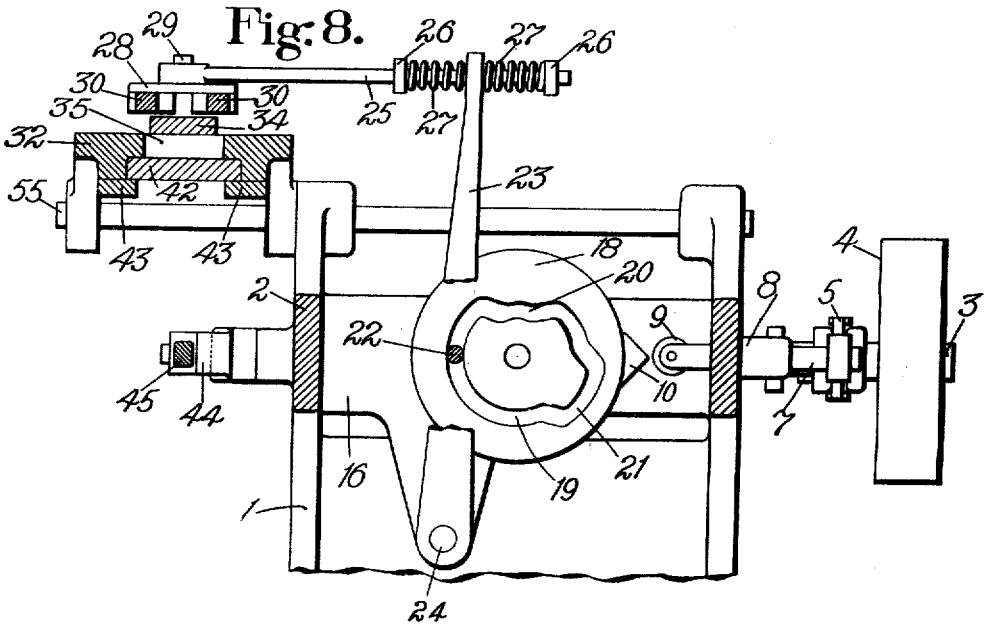
Fig. 8 is a section on the line VIII—VIII of Fig. 2, showing the machine at the beginning of its operative cycle.
Figure 10:
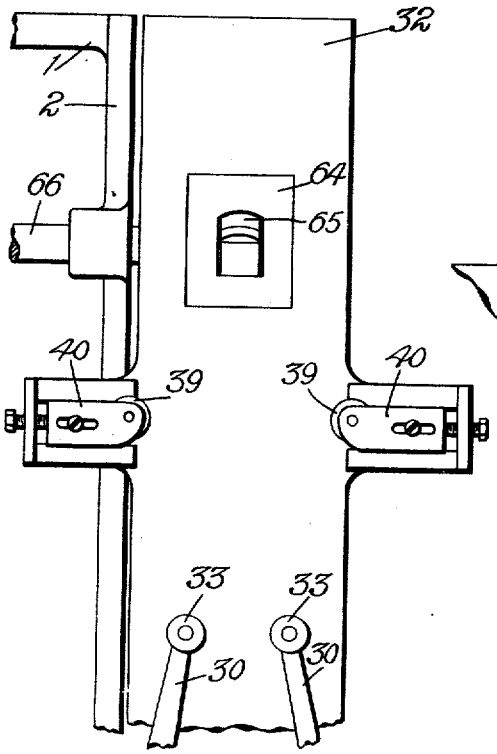
Fig. 10 is a detail plan view showing the arrangement of the removable plate.
Figure 9:
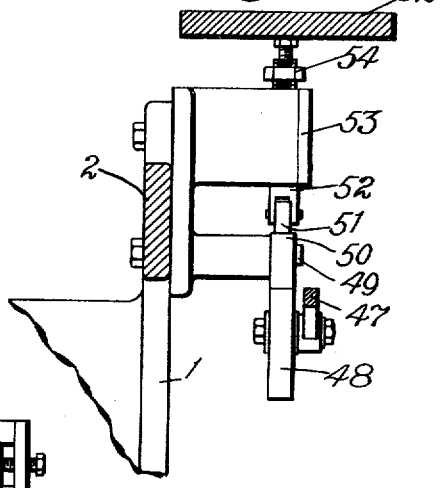
Fig. 9 is a section on the line IX—IX of Fig. 2.

The shaft 3 carrying the clutch 5 is provided with a bevel gear 14 which meshes with a bevel gear 15 carried on a shaft journaled in the cross-member 16 of the frame, on the other end of which shaft, which is designated 17, is mounted the cam disk 18 having a cam groove 19 provided with a low point 20 and a high point 21 (see Fig. 8). In this cam travels a cam pin 22 mounted on an arm 23 which is pivoted at 24 on the cross frame member 16. The upper end of this arm is provided with an eye through which passes a pitman 25. On the pitman are a pair of spaced collars 26 so that between the eye of the arm 23 at each of these collars there can be located a spring 27 to form a yielding connection between the lever 23 and the pitman 25. This pitman is connected at its other end to the lateral positioning arms 30 which are connected by a yoke 28. 29 designates the pivotal connection of the pitman. The arms 30 are pivoted at 31 upon the table 32. The free ends of these arms are provided with guiding rollers 33 which engage with the sides of the reciprocating carrier 34 which slides freely on the table 32. The carrier 34 has a T-shaped rear end or crosshead 34*a*, which slides on the table 32 and is guided in a cut-away portion 35 in the table 32. It is this reciprocating carrier 34 which carries the heel holder. The table itself is provided with a pair of plates having arcuate sides, such plates being designated 35*a*. The plates are mounted by a bolt or screw 36 on the reciprocating member 34 and have their free forward ends adjustable by means of a set screw 37 working in a slot 38 in the plates 35*a*. The outer edges or sides of these plates engage the stationary supported, rotatively mounted rollers 39 which are held in the adjustable holders 40 on the table 32. The plates 35*a* are used for the purpose of determining the shape of the cut. The rollers 39 determine the exact amount of lateral movement which may be imparted to the reciprocating member 34. It will be understood that the crosshead 34*a* is pivoted on a hub 41 extending upwardly from a slide 42 which moves in the guides 43 in the table 32. Thus the reciprocating carrier 34 is adapted to have a lateral movement depending upon the position of the positioning rollers 33 and the arms 30, and a reciprocating movement, such reciprocating movement being imparted to it by the following mechanism. The shaft 3 is provided with a crank 44 to which is connected a link 45. This link is pivotally connected to a depending arm 46 on a slide 46*a* running backward and forward in guides 46*b* on the table 32. The slide 46*a* is adjustably connected by a threaded bolt 46*c* to the slide 42. The arm 46 has pivotally connected to it another link 47 which is adjustably mounted at its other end in a crank arm 48 pivoted at 49 on the leg 1 and carries on its pivotal end a cam surface 50 adapted to engage with a cam roller 51 which is pivotally mounted on the end of a slide 52 carried in a guide 53 on the upper end of the leg 1. The adjustable end 54 of this slide engages with the under surface of the table 32 so that the table is moved up and down at its free end about its pivotal support on the frame at 55.

The reciprocating carrier 34 carries an adjustable slotted arm 56 in which is located a set screw or bolt 57 that adjusts the position of this arm. This arm carries a heel holder comprising a head 58. On either side of the head at 59*a* are pivotally mounted side members 59 between the free ends of which there is located the longitudinally adjustable heel retaining block 60 which embraces the rear of the heel while the forward or breast face of the heel is engaged by an arcuate replaceable member 61 carried by the head 58. The overhanging arm 62 has an adjustable engaging screw 63 depending therefrom, which engages the bottom of the heel, as the heel is in upside-down position so that its upper surface can be concaved or grooved. The notched heel retaining block 60 acting upon the tapered periphery of the heel serves to press the heel toward the table, and also toward the member 61. This brings me to an important feature of my invention, namely, the use in the table 32 of a detachable, removable plate 64 which is located in a cut-away portion of the table. This plate is of soft wood, fibre or soft metal and is adapted to have a portion cut therethrough which is of the same dimensions as the effective cross-section of the milling cutter 65 which is carried on the shaft 66 that drives it. This plate is retained in position by detachable supports 67 on the bottom of the table 32. In handling the removable plate 64, which may be made of any soft material, it is my practice to insert it in the table 32 allowing it to drop on the cutter which cuts a hole exactly the same size as the cutter. The cutter is adapted to project through the removable plate and slightly above it so that as the heel is reciprocated over it it will cut a shallow concavity out of the heel, the width of which is determined by the lateral position imparted to the heel. As there is a margin around the heel of nearly one sixteenth of an inch that is not acted on by the cutter, this margin is supported by the plate 64. The lateral positioning of the heel is controlled through the cam plate 18 and its associated mechanism 35*a*, 39 which serves to shift the arms 30 and the position of the guiding rollers 33 which in turn moves the slide 34 about its pivot 41 and determines the exact direction of its reciprocation. By adjusting the came mechanism 35*a*, 39 it is possible to vary the width of the groove.

The depth of the cut is determined by the adjustment of the screw 54. If a vertically sloping cut is desired the sharpness of the slope is determined by the position and adjustment of the arm 48.

Figure 3:
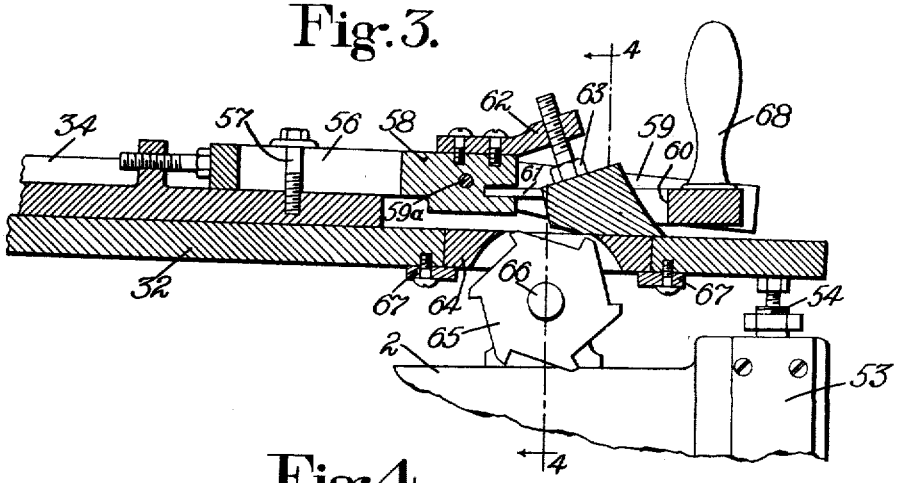
Fig. 3 is a section on the line III—III of Fig. 1.
Figure 4:
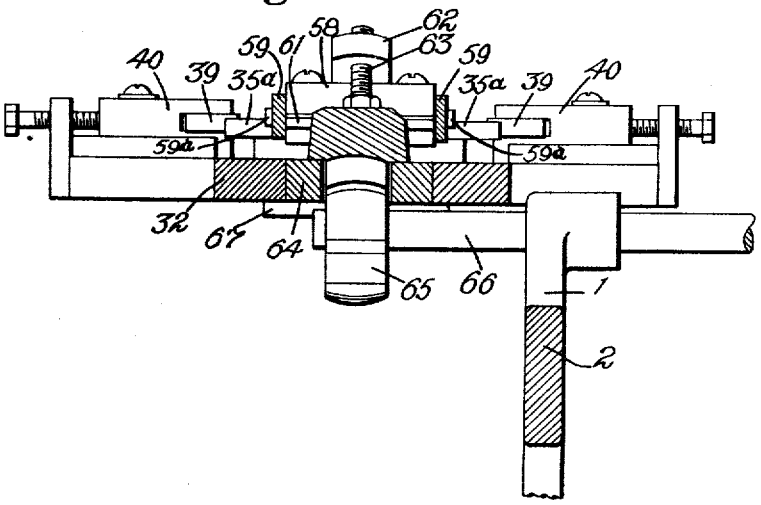
Fig. 4 is a section on the line IV—IV of Fig. 3.
Figure 5:
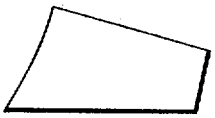
Fig. 5 is a side elevation of a heel block.
Figure 6:
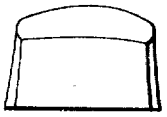
Fig. 6 is a front elevation thereof before the block has been concaved.
Figure 7:
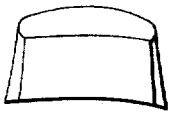
Fig. 7 is a front elevation thereof after the concaving operation has taken place.

Another feature of the invention resides in the mechanism for handling the heel and moving it over the cutter. In accordance with the present invention the heel is engaged upon separated points of its tapering side surfaces by the edges of the heel retaining block 60. The downward pressure of this member tends to press the heel firmly against the table 32 and against the member 61. As is well understood, and as shown in Fig. 3, wooden heels taper outwardly from the bottom of the heel to the attaching face, and the member 60, by engaging merely at separated points the lateral surface where it tapers outwardly to the attaching face, acts to hold the heel firmly in place. Thus, the construction and operation of the heel holder is very simple. At the same time the heel slides freely over the table in operative relation to the cutter. By this method the heel is concaved without the necessity of having clamping holders operated by cams and I am enabled to provide a mechanism which will take any kind of a heel, even very low heels, which are ordinarily very difficult to handle in the concaving machines know in the art.

I have thus provided in one machine, in adjustable form, a simple mechanism for accomplishing the following:—

(1) The regulation of the depth of the concavity.

(2) The regulation of the width of the concavity.

(3) The regulation of the taper of the concavity.

(4) The handling of any type of heel in the same mechanism with slight adjustment or the substitution of minor holding parts.

(5) Means for firmly holding the heel on the front, back and top and for moving it back and forth over the cutter.

(6) A detachable, readily changeable cutter guard forming a part of the supporting table so as to regulate the degree of the cutting action, while at the same time providing a table portion associated with the cutter which will not injure it yet which will properly support the heel being passed over it.

The operation of the machine is as follows: At the time the operator inserts a heel the crank 44 extends horizontally to the front, as shown in Fig. 8. This brings the heel holding mechanism to its extreme forward position. The operator tilts up the elements 59, 60 about the pivot 59*a*, inserts the heel and brings the member 60 down upon its rear surface, thus holding the heel downward against the table and securing it against sidewise movement relatively to its holder. The clutch 5 being thrown, the cam disk 18 and crank 44 begin to rotate. The machine then goes through its cycle, the heel holder being moved back and forth by means of the crank 44, and laterally at times by the cam disk 18. The projection 10 rotating with the cam member 18 at the end of a cycle of operations is adapted to throw the clutch lever 6 and the clutch 5 so that the cycle of operations, which imparts to the heel the proper concavity, will be terminated and the power disconnected.

The members 59 and 60 are then turned up by the operator by means of a handle 68 and the finished heel is removed.

It will be understood that I desire to comprehend within my invention such modification as may be necessary to adapt it to varying conditions and uses.

Having described my invention, what I claim as new and desire to secure by Letters Patent of the United States is:

1. In a heel concaving machine, a table, means to reciprocate a heel, a cutter to concave a heel supported adjacent the table, a detachable guard for the cutter, means to guide the reciprocating means in the direction of the cut, means comprising a plurality of arms pivoted to the table to guide the reciprocating means in a direction laterally of the cut, and means to hold said heel in said reciprocating means.

2. In a heel concaving machine, a table, means to reciprocate a heel, a cutter to concave a heel supported adjacent the table, a detachable guard for the cutter, means to guide the reciprocating means in the direction of the cut, means comprising a plurality of arms pivoted to the table to guide the reciprocating means in a direction laterally of the cut, means to hold said heel in said reciprocating means, and means to render said reciprocating means inoperative upon the accomplishment of the concaving operation.

3. In a heel concaving machine, means comprising front, top and movable rear engaging portions adapted to hold a heel to move it over a cutter, a cutter, and a detachable frame guarding said cutter and adapted to support said heel as it passes thereover.

4. In a heel concaving machine, means to hold a heel to move it over a cutter, a cutter, a detachable frame guarding said cutter and adapted to support said heel as it passes thereover, means to reciprocate said heel holding means, and means to control the lateral position of the cut.

5. In a heel concaving machine, means to hold a heel to move it over a cutter, a cutter, a detachable frame guarding said cutter and adapted to support said heel as it passes thereover, means to reciprocate said heel holding means, means to control the lateral position of the cut, and means to regulate said lateral positioning means in order to impart a series of laterally disposed cuts to said heel.

6. In a heel concaving machine, a reciprocating means adapted to hold a heel, a table for said reciprocating means, a cutter, a detachable guard mounted in said table adapted to support said heel and guard said cutter, and means for regulating the elevation of said table with respect to said cutter.

7. In a heel concaving machine, a reciprocating means adapted to hold a heel, a table support for said reciprocating means, a cutter, a detachable guard mounted in said table adapted to support said heel and guard said cutter, means for regulating the elevation of said table with respect to said cutter, and means to regulate the taper of the cut in said heel.

8. In combination, a movable supporting table, a reciprocating heel carrying member mounted thereon and movable therewith, a cutter adapted to project through said table, and means for varying the height of said table adjacent said cutter to impart a taper to the concavity of the cut in the heel.

9. In combination, a movable supporting table, a reciprocating heel carrying member mounted thereon and movable therewith, a cutter adapted to project through said table and means for varying the height of said table adjacent said cutter to impart a taper to the concavity of the cut in the heel, and means to change the elevation of said table for controlling the taper and to simultaneously drive the reciprocating member.

10. In combination, a movable supporting table, a reciprocating heel carrying member mounted thereon and movable therewith, a cutter adapted to project through said table and means for varying the height of said table adjacent said cutter to impart a taper to the concavity of the cut in the heel, means to change the elevation of said table for controlling the taper and to simultaneously drive the reciprocating member, and means carried on said table for regulating the lateral position of said reciprocating heel carrying member.

11. In combination, a movable supporting table, a reciprocating heel carrying member mounted thereon and movable therewith, a cutter adapted to project through said table and means for varying the height of said table adjacent said cutter to impart a taper to the concavity of the cut in the heel, means to change the elevation of said table for controlling the taper and to simultaneously drive the reciprocating member, means carried on said table for regulating the lateral position of said reciprocating heel carrying member, and means for successively employing the lateral positioning means and the resulting lateral position of said heel carrying member to impart a series of cuts to said heel.

12. In combination, a movable supporting table, a reciprocating heel carrying member mounted thereon and movable therewith, a cutter adapted to project through said table and means for varying the height of said table adjacent said cutter to impart a taper to the concavity of the cut in the heel, means to change the elevation of said table for controlling the taper and to simultaneously drive the reciprocating member, means carried on said table for regulating the lateral position of said reciprocating heel carrying member, means for successively employing the lateral positioning means and the resulting lateral position of said heel carrying member to impart a series of cuts to said heel, and means associated therewith to render inoperative the driving means when said concaving operation has been finished.

13. In combination, a movable supporting table, a reciprocating heel carrying member mounted thereon and movable therewith, a cutter adapted to project through said table and means for varying the height of said table adjacent said cutter to impart a taper to the concavity of the cut in the heel, and a detachable guard mounted in said table beneath said reciprocating member adapted to protect said heel, regulate the depth of the cut and support said heel.

14. In combination, a movable supporting table, a reciprocating heel carrying member mounted thereon and movable therewith, a cutter adapted to project through said table and means for varying the height of said table adjacent said cutter to impart a taper to the concavity of the cut in the heel, means to change the elevation of said table for controlling the taper and to simultaneously drive the reciprocating member, and a detachable guard mounted in said table beneath said reciprocating member adapted to protect said heel, regulate the depth of the cut and support said heel.

15. In combination, a movable supporting table, a reciprocating heel carrying member mounted thereon and movable therewith, a cutter adapted to project through said table and means for varying the height of said table adjacent said cutter to impart a taper to the concavity of the cut in the heel, means to change the elevation of said table for controlling the taper and to simultaneously drive the reciprocating member, means carried on said table for regulating the lateral position of said reciprocating heel carrying member, and a detachable guard mounted in said table beneath said reciprocating member adapted to protect said heel, regulate the depth of the cut and support said heel.

16. In combination, a movable supporting table, a reciprocating heel carrying member mounted thereon and movable therewith, a cutter adapted to project through said table and means for varying the height of said table adjacent said cutter to impart a taper to the concavity of the cut in the heel, means to change the elevation of said table for controlling the taper and to simultaneously drive the reciprocating member, means carried on said table for regulating the lateral position of said reciprocating heel carrying member, means for successively employing the lateral positioning means and the resulting lateral position of said heel carrying member to impart a series of cuts to said heel, and a detachable guard mounted in said table beneath said reciprocating member adapted to protect said heel, regulate the depth of the cut and support said heel.

17. In combination, a movable supporting table, a reciprocating heel carrying member mounted thereon and movable therewith, a cutter adapted to project through said table and means for varying the height of said table adjacent said cutter to impart a taper to the concavity of the cut in the heel, means to change the elevation of said table for controlling the taper and to simultaneously drive the reciprocating member, means carried on said table for regulating the lateral position of said reciprocating heel carrying member, means for successively employing the lateral positioning means and the resulting lateral position of said heel carrying member to impart a series of cuts to said heel, means associated therewith to render inoperative the driving means when said concaving operation has been finished, and a detachable guard mounted in said table beneath said reciprocating member adapted to protect said heel, regulate the depth of the cut and support said heel.

18. In a concaving machine, a frame, a table, a reciprocating slide, a heel carrying member adapted to be supported by said table and pivoted on said slide, adjustable means for moving said heel carrying member about its pivot on the slide, a cutter adapted to project through said table to engage with the heel, and means for reciprocating said slide.

19. In a concaving machine, a frame, a table, a reciprocating slide, a heel carrying member adapted to be supported by said table and pivoted on said slide, movable means for moving said heel carrying member about its pivot on the slide, a cutter adapted to project through said table to engage with the heel, means for reciprocating said slide, and means in combination with the reciprocating means for successively moving in opposite directions the means for determining the lateral position of the heel carrying member about its pivot on the slide.

20. In a concaving machine, a frame, a table, a reciprocating slide, a heel carrying member adapted to be supported by said table and pivoted on said slide, means for moving said heel carrying member about its pivot on the slide, a cutter adapted to project through said table to engage with the heel, means for reciprocating said slide, means in combination with the reciprocating means for successively altering the position of the means for determining the lateral position of the heel carrying member about its pivot on the slide, and means to regulate the shape of the cut.

21. In a concaving machine, a frame, a table, a reciprocating slide, a heel carrying member adapted to be supported by said table and pivoted on said slide, adjustable means for moving said heel carrying member about its pivot on the slide, a cutter adapted to project through said table to engage with the heel, means for reciprocating said slide, means in combination with the reciprocating means for successively altering the position of the means for determining the lateral position of the heel carrying member about its pivot on the slide, means to regulate the shape of the cut, and means to regulate the taper of the cut.

22. In a concaving machine, a frame, a table, a reciprocating slide, a heel carrying member adapted to be supported by said table and pivoted on said slide, adjustable means for moving said heel carrying member about its pivot on the slide, a cutter adapted to project through said table to engage with the heel, means for reciprocating said slide, means in combination with the reciprocating means for successively varying the position of the means for determining the lateral position of the heel carrying member about its pivot on the slide, means to regulate the shape of the cut, means to impart a taper to the cut by the cutter, and means to regulate the said taper.

23. In combination, a frame, a table pivoted thereon, means to raise and lower one end of the table, a reciprocating slide mounted in said table, a heel carrier pivoted thereon, means for moving the heel carrier pivotally on its slide, means engaging the sides of the heel carrier alternately for determining the shape of the cut, a cutter adapted to project through the table, and means for successively operating the means that engage the sides of the heel carrier.

24. In combination, a frame, a table pivoted thereon, means to raise and lower one end of the table, a reciprocating slide mounted in said table, a heel carrier pivoted thereon, means for moving the heel carrier pivotally on its slide, means engaging the sides of the heel carrier alternately for determining the lateral position of the heel carrier, a cutter adapted to project through the table, and means for successively operating the means that determine the lateral position of the heel carrier, said lateral positioning means, means for raising and lowering the table, and reciprocating means being driven from a common source of power.

25. In combination, a frame, a table pivoted thereon, means to raise and lower one end of the table, a reciprocating slide mounted in said table, a heel carrier pivoted thereon, means for moving the heel carrier pivotally on its slide, means engaging the sides of the heel carrier alternately for determining the shape of the cut, a cutter adapted to project through the table, means for successively operating the means that engage the sides of the heel carrier, said side engaging means, means for raising and lowering the table, and reciprocating means being driven from a common source of power, and means for rendering the machine inoperative after a cycle of operations has been completed.

26. In a concaving machine, a heel holder consisting of a front engaging portion, a top engaging portion, a rear engaging portion, and means for rotatively connecting the rear engaging portion to the front engaging portion through an axis of rotation extending from side to side of a heel in the holder so that the rear engaging portion may be moved out of position to permit the insertion of the heel.

27. In a concaving machine, a heel holder consisting of a head, a detachable front engaging portion, arms pivotally connected with said head, a rear engaging portion carried by said arms, and an adjustable top engaging portion mounted on the head and extending over the bottom of the heel.

28. In a heel concaving machine, a concaving cutter, a detachable guard therefor, means comprising front, top and movable rear engaging portions adapted to hold the heel and to move it with respect to said cutter, means to regulate the depth of the cut, means to regulate the width of the cut, and means to regulate the shape of the cut.

29. In a heel concaving machine, a concaving cutter, means to hold the heel and to move it with respect to said cutter, a detachable guard therefor, means to regulate the depth of the cut, means to regulate the width of the cut, means to regulate the taper of the cut, and means to regulate the shape of the cut.

30. In a heel concaving machine, a work supporting table, a cutter projecting through the table, a heel holder having a member arranged to press upon the tapering periphery of a heel in the holder to force the heel toward the table, and means for moving the heel holder relatively to the cutter to concave the attaching face of the heel.

31. In a heel concaving machine, a work support having its operative surface lying in a plane, a tool having its operative portion located on one side of said plane, a heel holder located on the same side of said plane and comprising elements arranged to engage the tapering periphery of a heel and to exert pressure on the heel toward the said plane, and means for moving the holder and a heel held thereby, with the attaching face of the heel in said plane, over the tool.

32. In a heel concaving machine, a work support having its operative surface lying in a plane, a tool having its operative portion located on one side of said plane, a heel holder located on the same side of said plane and comprising a member arranged to be moved toward and from the said plane and, when moved toward the plane, to engage the tapering periphery of a heel with its attaching face in the plane and to press the heel toward the plane, and mechanism for relatively moving the holder and the cutter parallel to the plane to carry the heel relatively over the tool.

33. In a heel concaving machine, a work support having its operative surface lying in a plane, a tool having its operative portion located on one side of said plane, a heel holder located on the same side of said plane and comprising a pivoted member arranged to be swung toward the said plane to engage the tapering periphery of a heel with its attaching face in the plane and to press it toward the plane, and mechanism for moving the holder parallel to the plane to carry the heel over the tool.

34. In a heel concaving machine, a work support having its operative surface lying in a plane, a tool having its operative portion located on one side of said plane, a heel holder located on the same side of said plane and comprising members arranged to engage a heel, with its attaching face lying in said plane, at points on the periphery of a cross-section of the heel which is approximately parallel to the attaching face of the heel and to exert pressure on the heel substantially perpendicular to the plane, and mechanism for moving the holder parallel to the plane to carry the heel over the tool.

35. In a heel concaving machine, a work support having its operative surface lying in a plane, a tool having its operative portion located on one side of said plane, a heel holder located on the same side of said plane and comprising members arranged to engage a heel, the attaching face of which lies in the said plane, at separated points on the periphery of a transverse cross-section thereof which is substantially smaller than the attaching face of the heel, and to exert pressure on the heel in a direction toward its attaching face and transverse to the said plane, and mechanism for moving the holder parallel to the plane to carry the heel over the tool.

36. In a heel concaving machine, a work support having its operative surface lying in a plane, a tool having its operative portion located on one side of said plane, a heel holder located on the same side of said plane and comprising a forked member arranged to engage oppositely located points on the tapering periphery of a heel having its attaching face located in the plane, and to exert pressure on the heel substantially perpendicular to the plane, and mechanism for moving the holder parallel to the plane to carry the heel over the tool.

37. In a heel concaving machine, heel engagaing means comprising front, top and movable rear engaging portions adapted to hold a heel to move it over a cutter, and a member adapted to support the heel as it passes over the cutter.

38. In a heel concaving machine, a table, a heel holder arranged to hold a heel with its attaching face in contact with the table, a cutter projecting through the table, means for reciprocating the holder over the cutter, and means for varying and controlling the position of the holder laterally of the direction of reciprocation.

39. In a heel concaving machine, a plane work supporting table, a cutter projecting through said table, a movable heel holder located adjacent to the work supporting face of the table, and power-driven means connected to the heel holder for moving the holder in a plane parallel to the work supporting face of the table to slide a heel in the holder along the table over the cutter.

40. In a heel concaving machine, a plane work supporting table having a slot therein, a rotary cutter projecting through said slot, the effective surface of revolution generated by the cutter substantially filling said slot, a movable heel holder located adjacent to the operative face of the table and arranged to hold a heel with its attaching face resting on the work supporting face of the table, and power-driven means connected to the heel holder for moving the holder in a plane parallel to the operative face of the table to carry the heel over the cutter.

41. In a heel concaving machine, a horizontal plane work supporting table having a slot therein, a cutter arranged to rotate upon an axis lying below the operative face of the table and to project through the slot, the edge of the slot being substantially coincident with the intersection of the work supporting face of the table and the surface of revolution generated by the cutter, whereby a heel resting on the table and being treated by the cutter will be supported at points immediately adjacent to the point of cut, a movable heel holder located above the table and arranged to hold a heel with its attaching face resting upon the table, and power-driven means connected to the heel holder for moving the heel holder in a plane parallel to the operative face of the table to carry the heel over the cutter.

42. In a wood heel concaving machine, a work supporting table having a slot therein, a rotary cutter projecting through said slot, the edge of the slot being substantially coincident with the intersection of the surface of revolution generated by the cutter and the operative work supporting face of the table, whereby the attaching face of a heel blank on said table being operated upon by said cutter will be supported immediately adjacent to the point of cut, a movable heel holder arranged to hold a wood heel blank with its attaching face lying upon the work supporting face of the table, and power-driven means for imparting to the heel holder movement lengthwise and sidewise of the attaching face of the heel in a plane parallel to the work supporting face of the table to form a U-shaped concavity in the attaching face of the heel blank.

43. In a heel concaving machine, a horizontal plane work supporting table having a slot therein, a cutter arranged to rotate upon an axis lying below the operative face of the table and to project through the slot, the edge of the slot being substantially coincident with the intersection of the work supporting face of the table and the surface of revolution generated by the cutter, whereby a heel resting on the table and being treated by the cutter will be supported at points immediately adjacent to the point of cut, a movable heel holder located above the table and arranged to press downwardly and laterally on a heel blank having a face resting upon the table, and power-driven means connected to the heel holder for moving the heel holder in a plane parallel to the operative face of the table to carry the heel over the cutter.

44. In a heel concaving machine, a horizontal plane work supporting table having a slot therein, a cutter arranged to rotate upon an axis lying below the operative face of the table and to project through the slot, the edge of the slot being substantially coincident with the intersection of the work supporting face of the table and the surface of revolution generated by the cutter, whereby a heel resting on the table and being treated by the cutter will be supported at points immediately adjacent to the point of cut, a movable heel holder located above the table and arranged to press downwardly and laterally at separated points of the periphery of a heel blank having a face resting upon the table, and power-driven means connected to the heel holder for moving the heel holder in a plane parallel to the operative face of the table to carry the heel over the cutter.

In testimony whereof I have signed my name to this specification.

CARL I. POLLARD.

CERTIFICATE OF CORRECTION.

Reissue Patent No. 17,942. Granted January 27, 1931, to

CARL I. POLLARD.

It is hereby certified that the name of the assignee in the above numbered patent was erroneously described and specified as "United Shoe Machinery Company", whereas said name should have been described and specified as United Shoe Machinery Corporation, as shown by the records of assignments in this office; and that the said Letters Patent should be read with this correction therein that the same may conform to the record of the case in the Patent Office.

Signed and sealed this 9th day of February, A. D. 1932.

M. J. Moore,
Acting Commissioner of Patents.

(Seal)